United States Patent

[11] 3,537,556

[72] Inventors David J. Pfeffer
Waukesha and
George W. Culbertson, Oconomowoc,
Wisconsin
[21] Appl. No. 766,686
[22] Filed Oct. 11, 1968
[45] Patented Nov. 3, 1970
[73] Assignee Industrial Clutch Corporation
Waukesha, Wisconsin
a corporation of Wisconsin

[54] CLUTCH
18 Claims, 5 Drawing Figs.
[52] U.S. Cl. .................................................. 192/70.28
[51] Int. Cl. .................................................. F16d 13/69
[50] Field of Search .................................... 192/70.28

[56] References Cited
UNITED STATES PATENTS
3,175,664 3/1965 Ramsel .................. 192/70.28
3,228,501 1/1966 Eason et al. ............ 192/70.28X Primary Examiner—Allan D. Herrmann
Attorney—Johnson, Dienner, Emrich, Verbeck & Wagner ABSTRACT: A friction clutch comprising a set of outer driving clutch plates and a set of inner driven clutch disks in interspersed relation, in which said driving and driven clutch elements are forced together into frictional driving engagement by a compressed air cylinder, and are separated into released nondriving relation by a set of outer separator springs acting on the outer driving plates, and by a set of inner locator springs acting on the inner driven clutch disks. All of these springs are precompressed into self-contained spring units before assembling in the clutch, so that in any field operation requiring the disassembling and/or reassembling of the clutch it is not necessary to manually restore or establish any of the original or desired pressures in the springs by manual effort, which is an almost impossible task in most instances. All of the precompressed spring units are also permanently locked or fastened to their respective clutch elements, so that the springs cannot become separated and lost in any such assembling or disassembling operation, nor improperly connected nor associated with the wrong clutch element, etc.

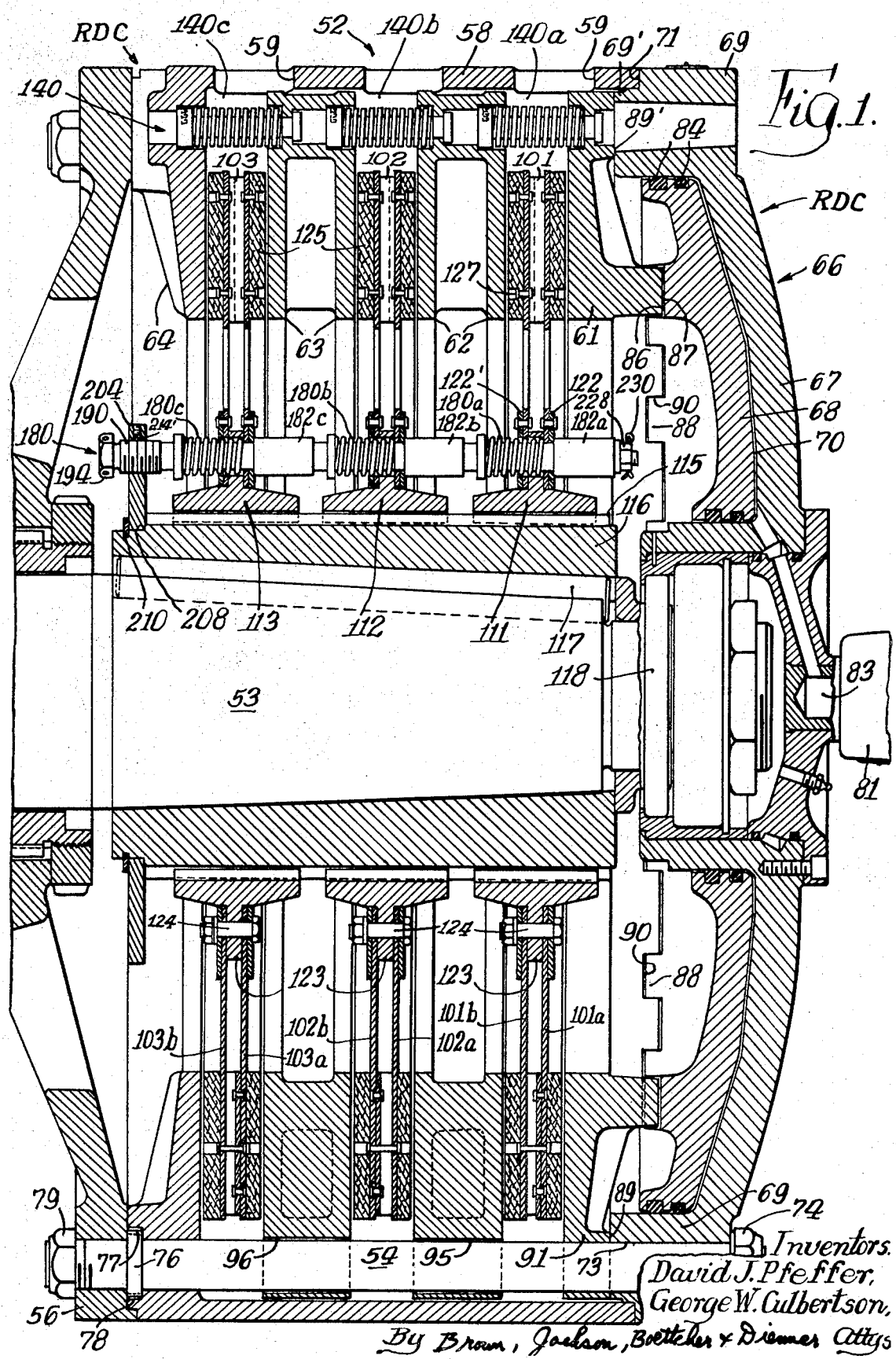

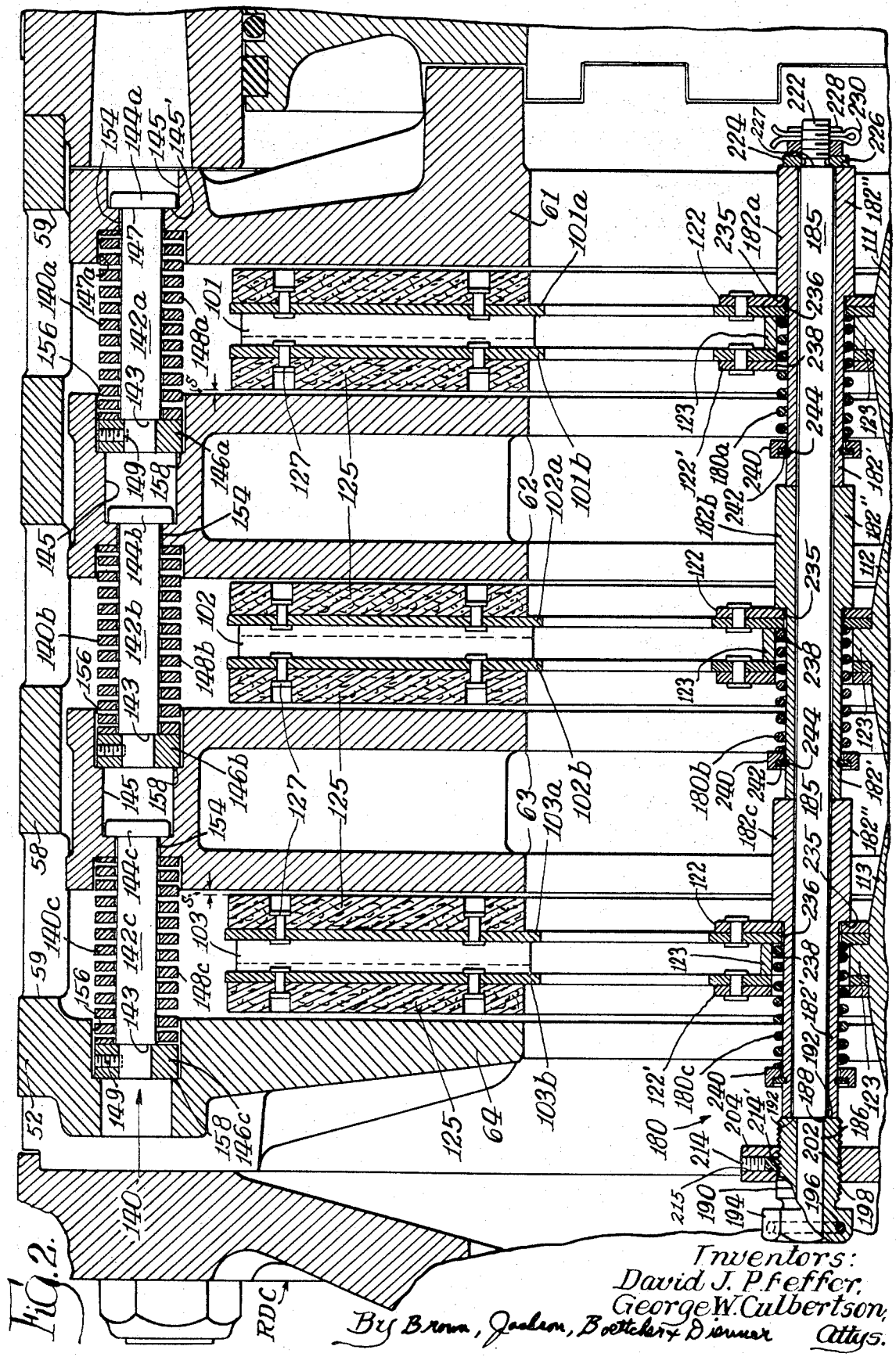

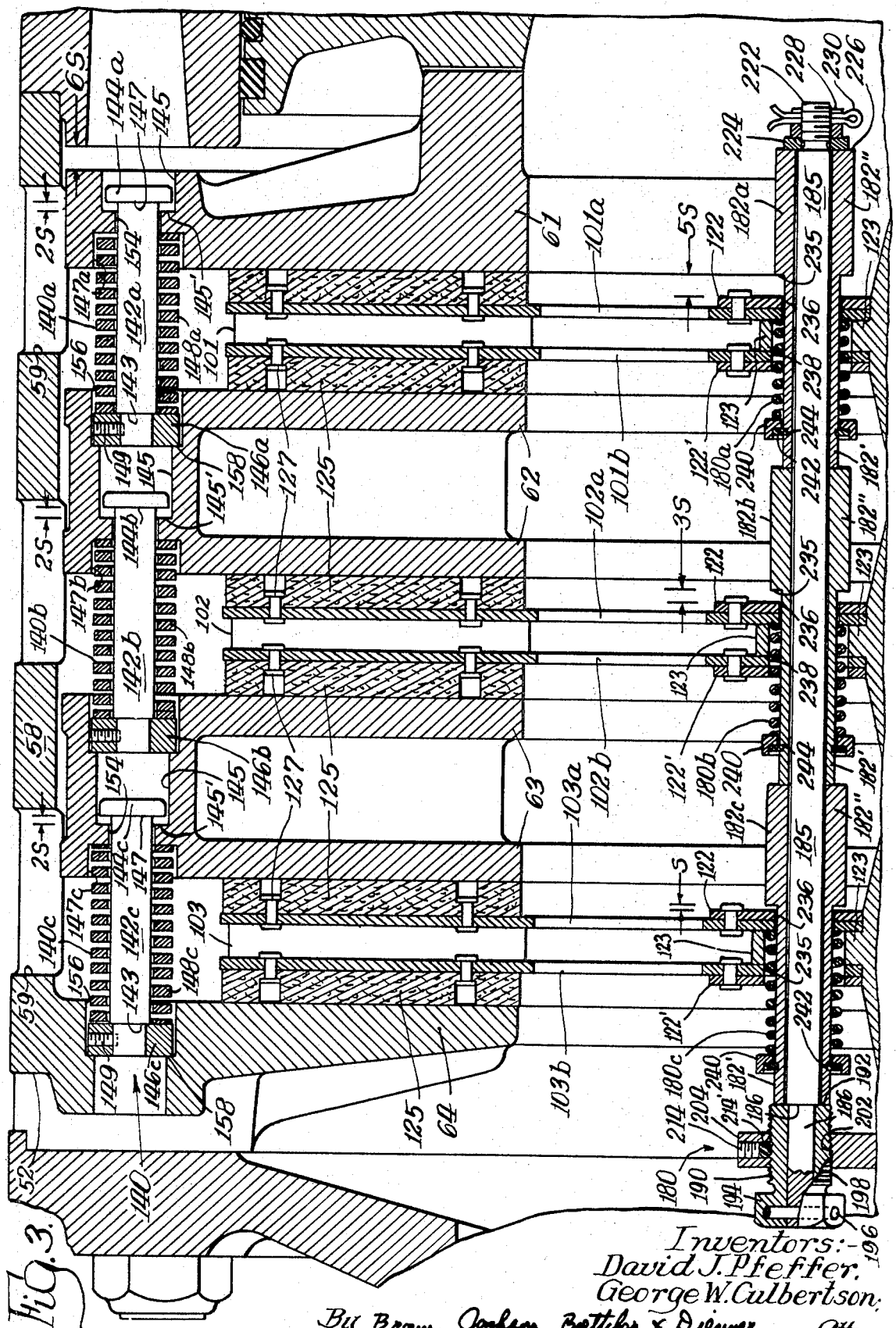

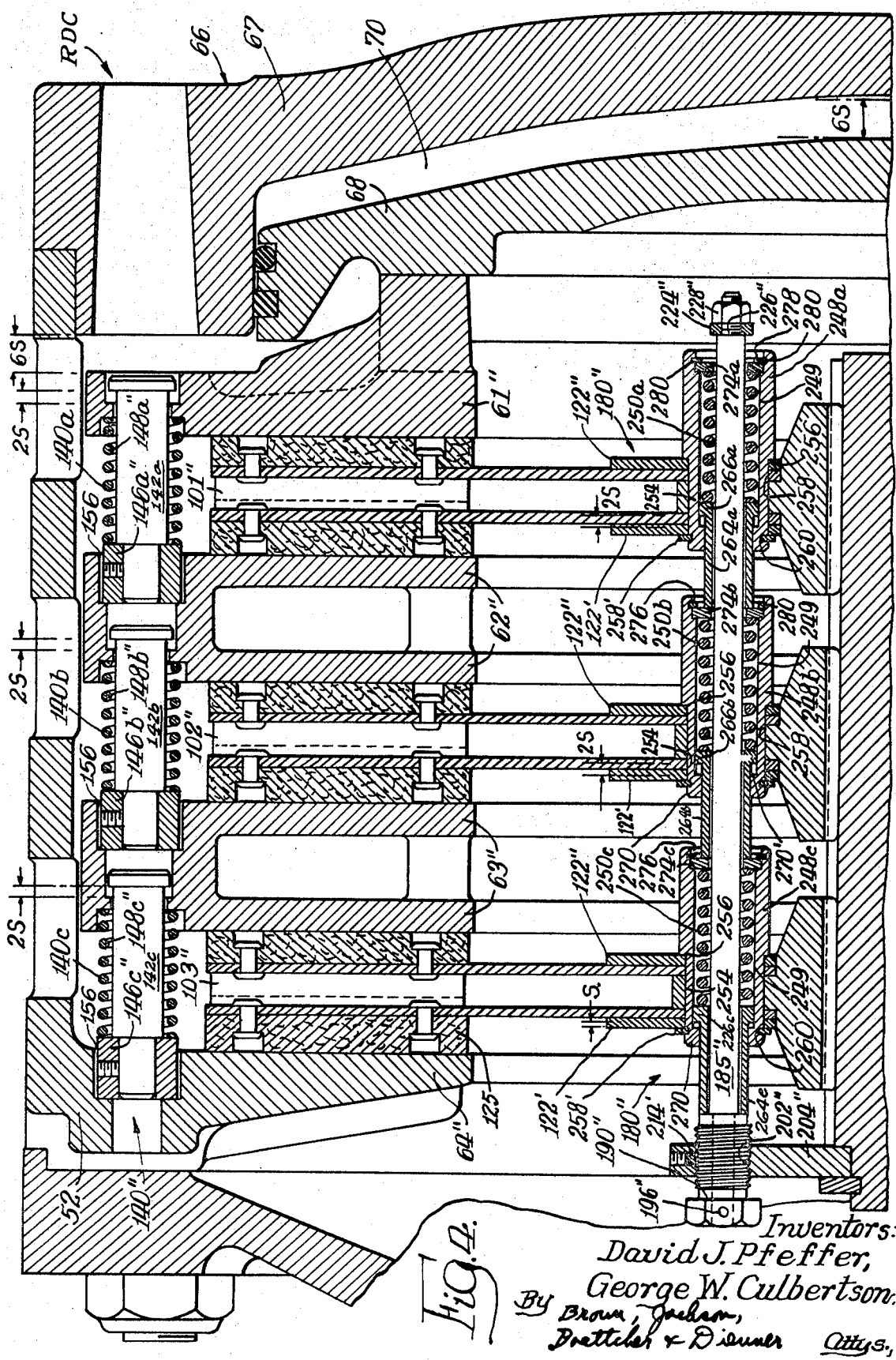

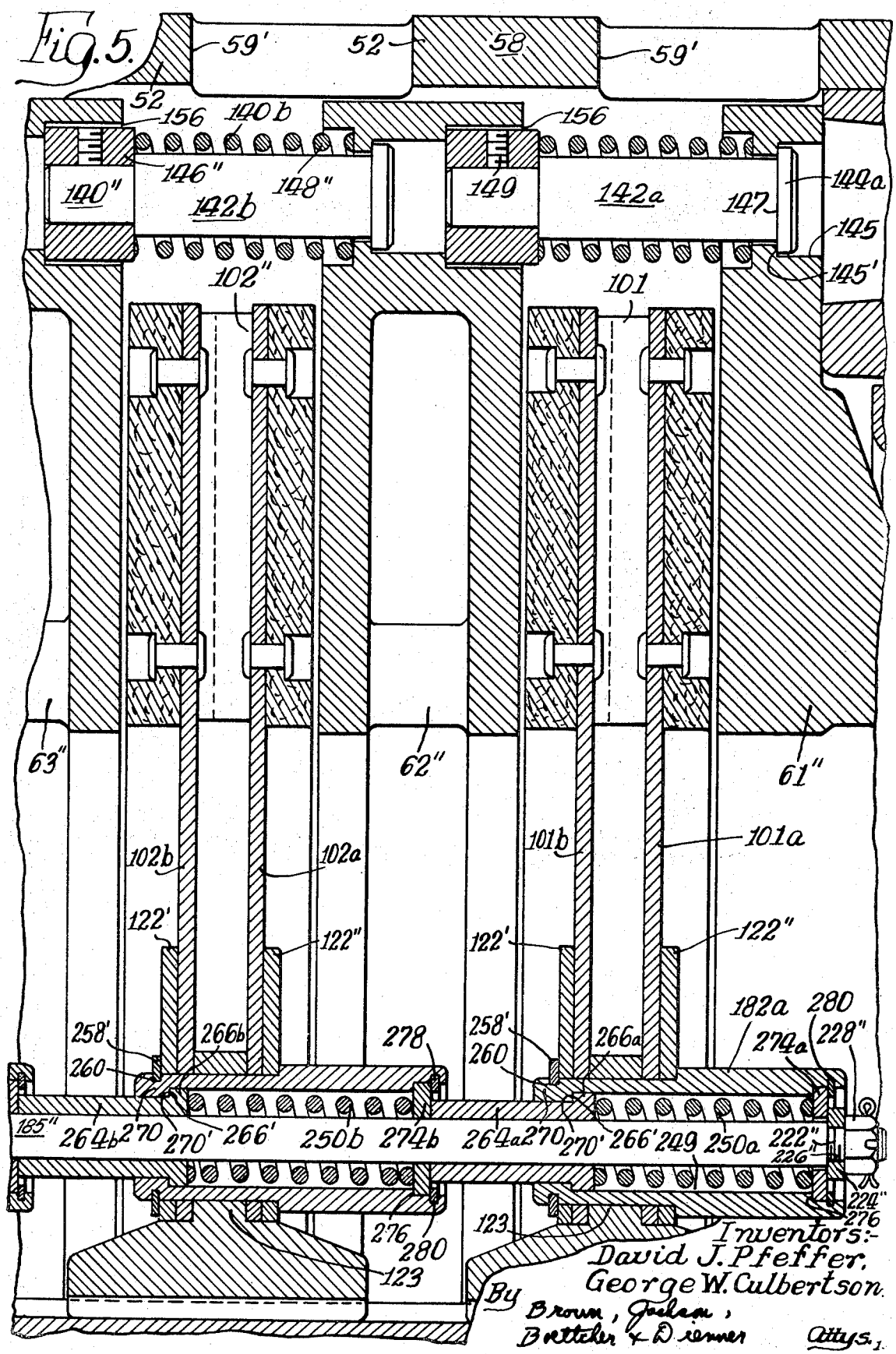

CLUTCH

CROSS-REFERENCE TO RELATED PATENT

This invention embodies improvements upon prior U.S. Pat. No. 3,228,501 issued to Clarence M. Eason, John J. Pfeffer and George W. Culbertson on Jan. 11, 1966.

SUMMARY OF THE INVENTION

As is fully disclosed in the aforesaid patent, the present clutch mechanism has particular utility in marine drives, wherein one clutch is used to drive the ship's propellor in one direction for forward propulsion, and another clutch is used to drive the propellor in the reverse direction for backward propulsion. This selective use of the two clutches avoids the necessity of having to shift any sliding gears into and out of mesh with each other. It is of particular importance in such use that when the reverse drive clutch is in disengaged position the driving and driven clutch elements thereof be accurately held in spaced noncontacting relation. This is particularly true in the reverse drive clutch, where in the idling condition the two sets of clutch elements revolve in opposite directions at relatively high differential speeds. In a marine installation, the clutches are usually installed at the downward inclination of the propellor shaft, which also tends to cause the clutch elements to slide downwardly. Furthermore, the fore and aft pitch of the ship tends to cause sliding movement of the clutch elements. All of this is fully described in the aforesaid U.S. Pat. No. 3,228,501.

Each of the relatively heavy outer clutch plates has a series of relatively heavy separating springs tending to restore these clutch plates to predetermined idling positions when the air pressure in the cylinder is released. In typical prior installations utilizing such springs, it frequently requires a force of about 500 pounds to compress these separating springs. In any disassembling and reassembling operation in the field, such as in the hold of a ship, it is practically impossible for a man to restore these pressures in such separating springs by manual effort. Also with regard to the sets of locator springs acting on the inner clutch disks these may require loading compression pressures of approximately 250 pounds. In any reassembling operation down in the hold of a ship, it is also extremely difficult or practically impossible for a man to restore these pressures in such sets of locator springs by manual effort.

The general object of the present invention is to avoid these difficulties by providing improved spring mounting constructions for making all of these springs self-contained in spring confining devices which are secured to their respective clutch elements. These confining devices maintain the initial compression pressures in each of the springs during any disassembling or reassembling operations in the field or otherwise, so that it is not necessary for the workman to reestablish such initial pressures by manual effort.

The fixed attachment of each spring confining device to its respective clutch element also prevents the possibility of any of the springs becoming separated from their clutch elements and lost, or of the springs being erroneously reconnected to the wrong clutch elements, etc.

The invention also includes a construction in which the different sets of springs each have substantial uniformity of pressure build-up, so that there are substantially no increasing increments of spring compression in the operation of the clutch. One of the virtues of this construction is that it avoids the possibility of any of the compression springs "going solid" (i.e. having adjacent convolutions come into abutting contact) in the operation of the clutch, and hence this construction permits the addition of outer clutch plates and inner clutch disks in the construction of the clutch substantially without limit.

The foregoing makes a unitized clutch plate and spring subassembly, the advantage of which becomes obvious, i.e., the several clutch plates can be assembled into or removed from the clutch with the springs being a part of each clutch plate instead of being loose. Since the springs are already compressed to their proper length, the clutch cylinder can be assembled and the cylinder nuts tightened without the need of a clamp to hold the cylinder in place while the nuts are started on the threads of the drive studs. Thus, the assembly of the present clutch is greatly facilitated.

Other features, objects and advantages of the invention will be apparent from the following detailed description of two embodiments thereof. In the accompanying drawings illustrating such embodiments:

DESCRIPTION OF THE DRAWINGS

FIG. 1 is a longitudinal or axial sectional view illustrating a drive clutch of the above transmission system, the clutch being shown in its released or disengaged position;

FIG. 2 illustrates a fragmentary portion of FIG. 1 on a larger scale, this view also showing the clutch in its released position;

FIG. 3 is substantially a duplicate of FIG. 2, but illustrates the clutch in its engaged or driving position;

FIG. 4 is an axial sectional view similar to FIGS. 2 and 3, but illustrating a modified construction; and FIG. 5 is a fragmentary sectional view of this latter construction, but with the clutch released.

DETAILED DESCRIPTION

The clutch illustrated in the above figures corresponds to the reverse drive clutch designated RDC in the aforesaid marine driving system disclosed in the above U.S. Pat. No. 3,228,501. For a full understanding of the manner in which the forward drive clutch and the reverse drive clutch selectively drive the propeller shaft in either direction, attention is directed to said patent. The improvements herein disclosed are applicable to both the forward and reverse drive clutches, which are of the same construction but are more applicable to the reverse drive clutch, which bears most of the brunt of wear.

The reverse drive clutch RDC comprises an outer drive housing 52 and an inner driven shaft 53. An outer set of driving clutch plates 61, 62, 63 and 64 have their outer peripheral portions shiftably secured to said clutch housing 52. An inner set of driven clutch disks 101, 102 and 103, interspersed between the outer clutch plates 61—64, have their inner peripheral portions shiftably secured to said inner driven shaft 53. The aforesaid prior patent describes at some length the adverse conditions under which the reverse drive clutch RDC operates in a marine installation. As pointed out therein, there will be opposite or differential directions of rotation of the outer and inner sets of clutch elements 61—64 and 101—103 in the reverse drive clutch RDC, at differential velocities twice that of the velocity of conventional running rotation, throughout the entire time that the forward drive clutch is transmitting forward propulsion. In the case of a vessel engaged in transoceanic travel, this forward propulsion can continue uninterruptedly for days or possibly weeks at a time. Throughout this entire time, the outer and inner sets of clutch elements 61—64 and 101—103 are continuously revolving in opposite directions, and at differential velocities which are twice the normal running velocity which ordinarily prevails where one set of clutch elements is revolving and the other set is standing stationary. That is to say, assuming an engine speed of 1000 r.p.m., in a transmission of conventional ratios, then in the idling condition of the reverse drive clutch RDC the outer set of clutch elements 61—64 and the inner set of clutch elements 101—103 are continuously revolving in opposite directions at differential velocities which are twice the normal running velocity which ordinarily prevails where one set of clutch elements is revolving and the other set is standing stationary. That is to say, assuming an engine speed of 1000 r.p.m. in a transmission of conventional ratios, then in the idling condition of the reverse drive clutch RDC the outer set of driving clutch elements 61—64 and the inner set of driven clutch elements 101—103 are rotating in opposite directions at a relative velocity of 2000 r.p.m. throughout the entire time that the forward drive clutch remains engaged. As illustrative of other adverse operating conditions in a marine installation, the entire transmission system including the reverse drive clutch RDC usually slopes downhill at the sloping angle of the propeller shaft; also the entire installation is subjected to severe vibrations, reverberated by the hull of the ship. It is all of these conditions that make it so important to accurately locate and maintain the idling or out-of-engagement shifted positions of the inner and outer sets of friction clutch elements. The forward drive clutch and the reverse drive clutch are both of the same construction, but it is the reverse drive clutch RDC that bears the brunt of the wear because of the above operating conditions.

The housing or annulus 52 takes the form of an outwardly projecting annular drum or housing portion 58 having spaced apertures 59 therein for cooling and access purposes. Formed at the inner portion of this annulus or housing is the radially extending, nonshiftable driving clutch plate 64. The opposite or outer end of this housing 58 mounts a compressed air power unit 66, comprising an outer cylinder 67 within which slides a piston 68, both of which rotate constantly with the outer driving housing 52. The compressed air cylinder 67 is formed with an annular outer rim 69 which has its inner edge turned down at 71 to form a piloted mounting fit within the outer end of the drum ring or housing 58.

Through-bolts 54 pass through holes 73 in the outer rim 69 of the compressed air cylinder and receive nuts 74 on their outer or front ends, there being several of these through-bolts equally spaced around the assembly. The inner ends of the through-bolts are formed with flanges or stop collars 76 receivable within annular counterbores 77 formed within the inner face of the housing 52, and the other or outer extremities of the through-bolts receive nuts 79 which serve to clamp together the drive flange 56, housing annulus 52, and compressed air cylinder head 67. The keying pins 78 interposed between the stop collars 76 and the recesses 77 prevent rotation of the through-bolts 54 when the nuts 74 or 79 are tightened. The cylinder space 70 between the cylinder head 67 and piston 68 is adapted to receive compressed air through any conventional form of rotary seal 81 which establishes communication between the stationary compressed air supply pipe and the revolving central port 83 leading to the cylinder area. The peripheral surface of the piston 68 has any suitable arrangement of piston rings, such as O-rings 84 composed of neoprene or the like. The inner surface of the piston 68 is provided with an inwardly projecting abutment shoulder 86 which is adapted to transmit axial thrust in an inward direction to a similar abutment shoulder 87 projecting outwardly from the first radially extending shiftable clutch plate 61. The abutment shoulder 86 is formed with milled lugs 88 which fit into notches 90 milled out in the other abutment shoulder 87, such arrangement preventing relative rotation of the piston within the cylinder, which would otherwise result in rapid wear of the O-rings 84.

Referring now to the driven disk elements of the clutch assembly, the drawings show three such driven clutch disk elements or assemblies 101, 102, 103, which are interspersed between the driving clutch plates as follows: the first driven disk assembly 101 is disposed between the first or outermost shiftable driving clutch plate 61 and the second shiftable driving clutch plate 62; the second driven disk assembly 102 is disposed between the second shiftable driving clutch plate 62 and the third shiftable driving clutch plate 63; and the third driven disk assembly 103 is disposed between the third shiftable clutch plate 63 and the fourth or innermost driving clutch plate 64, which is nonshiftable.

All three of these driven assemblies or disks 101, 102 and 103 are secured to separate axially aligned hubs 111, 112 and 113 which are internally splined for free axial sliding movement over external splines 115 on a hub 116 which is keyed at 117 to the tapered end of the shaft 53, and is held thereon by an end cap 118 which is pulled up against the end face of the hub by cap screws threaded into the outer end of the shaft 53, or by other fastening means.

Each of the three driven disk assemblies 101—103 comprises two laterally spaced sheet steel disks 101a—101b, 102a—102b, etc., which have their inner peripheries secured in spaced relation on opposite sides of flanges 123 projecting outwardly from the slidable bosses 111—113, this attachment preferably being effected between steel reinforcing disks 122-—122' by bolts 124 (FIG. 1). Secured to the outer faces of each cooperating pair of disks are rings or segments 125 composed of any suitable friction facing lining material, the latter being secured to the outer face of the metallic disks by the rivets 127, or by bonding, or otherwise. Secured to the inner faces of each cooperating pair of disks 101a—101b, etc., are channel-shaped spacers or separators which are secured by rivets in oblique angular positions across the faces of the disks, whereby to stimulate air circulation between the disks for cooling purposes during their rotary movement. This is all disclosed in the prior Eason Pat. No. 2,674,356. It will be understood that the above described details of clutch construction merely show an exemplary or preferred embodiment for illustrating one adaptation of the invention, but that the invention is not limited to clutches embodying these above described details.

Referring now to the improved clutch separating and locating apparatus of our invention, we will first describe the separating and locating apparatus which acts on the outer assembly of shiftable driving clutch plates 61, 62 and 63. This apparatus has the function of accurately restoring these shiftable outer clutch plates back into their predetermined original or normal positions when the clutch is released. Such separating and locating apparatus is designated 140 in its entirety, and comprises a plurality of angularly spaced self-contained spring sets or assemblies 140a, 140b and 140c, one set for each of the three shiftable driving clutch plates 61, 62 and 63.

These three self-contained spring assemblies are substantially identical, and are substantially permanently fastened at spaced points around the circle of each of their respective driving clutch plates. That is to say, each first spring assembly 140a is permanently fastened to the first shiftable clutch plate 61; each second spring assembly 140b is permanently fastened to the second shiftable clutch plate 62; and each third spring assembly 140c is permanently fastened to the third shiftable clutch plate 63. The fourth driving clutch plate 64, which is nonshiftable, has no self-contained spring assembly fastened thereto.

These three self-contained spring assemblies 140a, 140b, and 140c, which are substantially identical, each comprises the following main elements; a reciprocable stud 142a, etc.; a locking or motion limiting head 144a, etc., at the right hand end of the stud; a stop collar 146a, etc., fixedly secured to the reduced left hand end of the stud 142a against the shoulder 143; and a compression spring 148a, etc., surrounding the shank of the stud 142a between a counterbore 147a, etc., in the back side of the driving clutch plate 61, and the stop collar 146a. Each of these three compression springs 148a, etc., has a substantial degree of compression pressure set up or established therein before the shiftable outer clutch plate and its circular series of such self-contained spring assemblies are inserted into the open front end of the clutch housing 58.

The locking or motion limiting head 144a—144c on each stud 142a—142c has reciprocating freedom in a counterbore 145 formed in the front face of its respective shiftable clutch plate 61, 62, etc. The inner face 147 of this blocking head 144a—144c is adapted to normally abut the stop surface 145' in the bottom of the counterbore 145, under the action of the respective spring 148a—148c. This blocks or limits the motion of the stud 142 inwardly toward the left. The outer or adjacent end of the spring 148a—148c seats in a counterbore 147a formed in the inner face of the shiftable clutch plate in alignment with the outer counterbore 145. The stud 142 passes freely through a guide hole 154 connecting the two counterbores.

The stop collar 146a—146c and adjacent end of the spring 148a—148c extends into a counterbore 156 in the front face of the next adjacent driving clutch plate 62, etc., this stop collar abutting a shoulder 158 at the bottom of the counterbore 156. A set screw 149 fastens each stop collar 146a—146c to the reduced inner end of the stud 142a—142c. It will thus be seen that each spring impelled stud 142a—142c and its spring 148a—148c are permanently locked against endwise separation in either direction from their respective driving clutch plate 61, 62, etc. Also, in an assembling operation each spring pressed stud 142a—142c projects from its respective driving clutch plate in a rearward right angle relation, which facilitates the insertion of the collars 146a, 146b and 146c into the counterbores 156.

Referring now to the improved inner locating apparatus which acts on the three inner driven disk assemblies 101, 102 and 103, this locating apparatus comprises a plurality of angularly spaced aligned assemblies, each one of which is designated 180 in its entirety and has a self-contained spring assembly 180a, 180b and 180c, one for each of the three driven clutch disk assemblies 101, 102 and 103. These three compression springs 180a, 180b, etc., are mounted on three spacer sleeves 182a, 182b, etc., having end to end abutment on parallel locator rods 185 which extend longitudinally through the inner web portions of the three inner clutch disk assemblies 101—103.

The inner end of each locator rod 185 has a reduced shank portion 186, thereby forming a shoulder 188 thereon adjacent said inner end. Fitting over such reduced shank portion is a bushing 190 having an outer or right hand end 192 which abuts against the shoulder 188. The opposite inner end of such bushing is formed with a manual adjusting knob 194, and passing through such knob and through the reduced shank 186 is a transverse pin 196 for rigidly locking the bushing to the rod. Formed on the shank portion of the bushing is an external thread 198 which screws through an internally threaded hole 202 in a locator disk 204. Referring to FIG. 1, this disk 204 is secured fast to the inner end of the splined mounting hub 116, being held thereon against a shoulder 208 on the hub by a snap ring 210. The threaded joint 198, 202 between the bushing and the locator disk 204 positively locks the locator rod 185 against any shifting movement either inwardly or outwardly, from the fixed position of adjustment established by the manual rotation of the adjusting bushing 190. A set screw 214, preferably of a self-locking type, and a plastic button 214′ inserted in the threaded hole 215 in the locator disk 204 between the screw 214 and the threaded bushing 190, are used for rotatively locking the adjusting bushing 190 in any desired position of threaded adjustment inwardly or outwardly in the disk 204. The opposite or outer end of the locator rod 185 has a reduced threaded portion 222 over which slips a washer 224, held against the shoulder 226 of the end spacer sleeve 182a and against the shoulder 227 of the locator rod 185 by a castellated nut 228, which is normally held against rotation by a cotter pin 230 passing through the nut and through the threaded portion 222. The abutment of the opposite inner spacer sleeve 182c against the adjacent end of the manual adjustment bushing 190 and the abutment of the outer spacer sleeve 182a against the washer 224 and nut 228, together with the end to end abutment of all three sleeves, compels the three sleeves to have the same identical degree of adjustment as is given to the manual adjustment bushing 190 in either direction.

The three spacer sleeves 182a—182c are of substantially identical construction, each having an inner portion 182′ of relatively small diameter, and an outer portion 182″ of relatively larger diameter, these two portions defining an inwardly facing locating shoulder 235 therebetween.

Adapted for abutment against this locating shoulder 235 of each such spacer sleeve is the outer reinforcing disk 122 of each inner clutch disk assembly, this reinforcing disk and its associated main disk 101a—103a having an aperture 236 therethrough which has a snug sliding fit over the smaller diameter end 182′ of the spacer sleeve 182.

Drilled through the other reenforcing disk 122′, main disk 101b and flange 123 is a bore 238 of larger diameter, into which extends the outer end of the respective compression spring 180a—180c. This spring presses outwardly against the outer main disk 101a. The other inner end of each compression spring abuts against a washer 240 held in fixed position on the sleeve by a snap retainer ring 242 engaging in a groove 244 in the reduced portion of the spacer sleeve 182.

It will be seen from the foregoing that each of the outer shiftable driving clutch plates 61, 62 and 63 has a self-contained separating spring assembly 140a, 140b, and 140c associated therewith, whereby a predetermined pressure loading can be set up in the outer compression springs 148a—148c thereof before starting to insert the assembly into the clutch housing 58.

Similarly, the inner locator springs 180a, 180b, and 180c acting on the inner set of clutch disk assemblies 101, 102 and 103 are adapted to have a predetermined loading pressure set up in these locator compression springs 180a—180c before starting to insert the assembly into the clutch housing.

Since the outer springs 148a—148c and the inner springs 180a—180c have now been precompressed to their proper lengths, the outer and inner sets of clutch elements can thereupon be inserted into the housing 52, and the outer cylinder nuts 74 tightened up on the outer ends of the through-bolts 54, without the need of a clamp or the like to hold the cylinder in place while the nuts 74 are started on the threads of the bolts or drive studs 54. Thus, there are no "freefloating" or nonself-contained outer or inner springs, and there are no difficulties encountered in manually assembling and disassembling in a field operation, such as in the hold of a ship. In any such operation, it is also impossible for any springs to become lost, because of their anchored attachment to the outer clutch plates 61—63 and to the inner clutch disks 101-—103. In the clutch released position shown in FIG. 2, it will be seen that each of the four outer driving clutch plates 61-—64 is separated from the three inner driven clutch disks 101-—103 by a substantially constant or identical spacing distance S, which in the average marine clutch will generally be in the neighborhood of one-sixteenth inch.

Furthermore, with regard to the assembling operation, as long as the collars 146a—146c associated with the outer clutch plates 62 and 63, and the collars 240 associated with the inner clutch disks 101, 102 and 103, all point inwardly in the same direction, it does not matter which of the assemblies goes on first or second, etc., in their mounting.

Another feature of this design is the uniformity of spring pressure maintained in all of the outer separating springs 148a—148c. When the clutch is engaged, there are no increasing increments of travel S of the spring studs 142a—142c that is to say with the clutch engaged the relative travel between the spring studs 142a—142c and each of the outer clutch plates 61—63 is the same distance 2S in the case of each clutch plate, as shown in FIG. 3.

It will be seen that by reason of the fact that all of the outer springs 140a—140c and all of the inner springs 180a—180c are precompressed substantially to their desired working pressures before their insertion into the clutch housing 52, the workman can assemble the clutch with very little, if any, further compression of the springs and can immediately begin tightening up on the nuts 74 on the through-bolts 54.

In the preparatory precompression operation, each stud 142a—142c is first inserted through the guide hole 154 of one of the driving clutch plates 61—63, and the compression spring 148a—148c is then assembled over the stud. Thereupon, the spring is compressed substantially to its desired working length and pressure, the confining collar 146a—146c being pushed up to the end shoulder 143 on the stud and locked in place by the set screw 149. The pressure of the spring 148a—148c holds the stud 142a—142c projecting straight out rearwardly from the inner face of the driving clutch plate, in position to facilitate the introduction of the collar 146a—146c into the counterbore 156 and up against the shoulder 158 of the preceding outer clutch plate. This operation is repeated for each successive driving clutch plate, and can be done without regard to any sequence or order.

Referring now to the assembly of the inner locating apparatus 180, one of the spacer sleeves 182a—182c is inserted in an inward direction through apertures 236 and 238 of the inner clutch disk assembly 103, and the inner compression spring 180c is then pushed over the reduced end 182′ of the inner spacing sleeve 182c, following which the washer 240 is placed over the spacing sleeve against the inner end of the spring. The precompression pressure is set up in the inner spring 180c, whereupon the snap retainer ring 242 is snapped into place in the groove 244 inwardly beyond the washer 240. Thus, the precompression pressure is established in the spring 180c and is locked therein between the washer 240 at the inner end of the spring and the locating shoulder 235 of the associated spacer sleeve 182c at the outer end of the spring. The above assembling operation is repeated for each set of driving clutch plates 61—63 and driven clutch disks 101—103.

The locator rod 185, together with the adjusting bushing 190 and transverse pin 196 are assembled in the locator disk 204, which is assembled on the hub 116 and held in place thereon by the snap ring 210 (FIG. 1). This entire subassembly is assembled on the shaft 53 at the beginning of the assembly procedure before the inner clutch disks 101, 102 and 103 and the outer clutch plates 61, 62 and 63 are assembled. The adjusting bushing 190 is then screwed to any desired position of adjustment in its threaded mounting in the locator disk 204. This establishes the axial location of the several stops 235 to which the clutch disks 101—103 are moved under spring pressure when the clutch elements move to their clutch released position upon release of the compressed air from the cylinder 67.

It will be seen from the foregoing that all of the compression springs 148a—148c acting on the outer shiftable clutch plates 61—63, and all of the compression springs 180a—180c acting on the inner shiftable clutch disks 101—103, can have their maximum desired precompression pressures established therein before the outer driving clutch plates 61—63 and the inner driven clutch disks 101—103 are assembled within the clutch housing.

It will also be seen that each of these compression spring assemblies 140a—140c and 180a—180c can be permanently locked to each of their respective clutch elements 61—63 and 101—103 before assembly, so that there will be no loss of the precompression pressures, nor of any of the springs or other spring assembly parts.

Referring now to the modified embodiment shown in FIGS. 4 and 5, this has the same general arrangement of outer driving clutch plates, herein designated 61″, 62″, 63″ and 64″, between which are interspersed the same general arrangement of inner driven clutch disks, herein designated 101″, 102″ and 103″.

The separating and locating apparatus 140″ acting on the outer driving clutch plates 61″—64″ of this modified embodiment is substantially the same as the above described separating and locating apparatus 140 for the outer driving clutch plates 61—64 of the first embodiment (FIGS. 1—3).

Referring now to the separating and locating apparatus for the three inner driven clutch disks 101″—103″, this comprises a series of angularly spaced assemblies 180″ mounted on angularly spaced locator rods 185″ extending through the inner portions of the three driven clutch disks 101″—103″. The inner end of each locator rod 185″ has the same general arrangement for effecting endwise adjustment of the rod as previously described; i.e., the threaded bushing 190″ is pinned to the rod at 196″ and screws through the threaded hole 202″ in the locator disk 204″. The outer or opposite end of each of these locator rods mounts a stop washer 224″ held against a shoulder 226″ on the rod by a castellated nut 228″ screwing over the thread 222″ on the end of the rod (see FIGS. 4 and 5).

Each of the inner clutch disks 101″, 102″ and 103″ has slidable mounting on said locator rods through the medium of independently slidable spring container sleeves 248a, 248b and 248c. Each of these sleeves has a spring containing bore 249 in which is slidably mounted a cylindrical compression spring 250a, 250b and 250c. Each spring container sleeve has fixed attachment to its respective inner clutch disk 101″—103″ by forming the inner end of the container sleeve with a reduced shank portion 254 establishing an abutment shoulder 256. Aligned apertures 258 in the inner portions of the inner driven clutch disks 101″—103″ slip over these reduced shank portions 254, with each outer reenforcing disk 122″ abutting against each shoulder 256. Each spring container sleeve 248a—248c is held fixedly in place in its respective inner clutch disk 101″—103″, with its shoulder 256 abutting against reenforcing disk 122″ by a snap retainer ring 258′, which snaps into a retainer groove 260 in the end of the reduced shank portion 254, with the retainer ring 258′ in abutting engagement against the inner reenforcing disk 122′ of its respective inner clutch disk.

Slidably mounted in the inner or left hand end of each spring container sleeve 248a—248c is a pusher or connector sleeve 264a—264c the outer end of which has formed thereon at its right hand end within this associated spring bore 249 a radially projecting retainer flange 266a—266c against which the inner end of the associated compression spring 250a—250c bears.

The inner side of this retainer flange 266 is adapted to have retaining or hooking engagement with another retaining or hooking flange 270 projecting inwardly from the inner end of the associated spring containing sleeve 248, thereby providing for telescoping movement between the spring containing sleeve 248 and the connector sleeve 264, but limiting the outward separating motion between these two sleeves.

When the clutch is engaged the abutment face 266′ (FIG. 4) of the spacer sleeve flange 266 is spaced from the cooperating abutment face 270′ of the container sleeve flange 270 by a lost-motion space corresponding to the spacing distances which separate the clutch elements with the clutch disengaged. For example, this lost motion space is 2S in the case of the outermost driven clutch disks designated 101″ and 102″, and is S in the case of the last or innermost driven clutch disk designated 103″. Any additional driven clutch disks embodied in the design would have the same 2S lost motion spacing.

Referring again to the springs 250a—250c, the opposite or outer end of each spring 250a—250c abuts against an internal stop washer 274a—274c which is held fixed in a counterbore 276 at the outer end of the spring containing bore 249 by a retainer ring 278 which snaps into a groove 280 formed in the counterbore 276. This stop washer 274a—274c confines the outer end of its associated compression spring 250a—250c, and also forms an end wall against which the inner end of the next connector sleeve 264a—264c. In the case of the outermost driven clutch disk 101″, the stop washer 274a in the outermost spring container sleeve 248a is adapted to strike or bear against the outer stop washer 224″ mounted by the above described nut 228″ on the outer end of the locator rod 185″, when the clutch is released or disengaged, as shown in FIG. 5.

When the clutch is in its released or disengaged condition, the outer driving clutch plates 61″—63″ occupy their outwardly shifted positions, substantially as shown in FIGS. 2 and 5. At this time the retracted position of the pneumatic piston 68 permits the springs 148a—148c to shift the outer driving clutch plates 61″—63″ to their nonclutching positions. This takes the shifting clutching pressure off of the inner driven clutch disks 101″—103″, whereupon the pressures of the three compression springs 250a—250c shift the three inner clutch disks 101″—103″ to their released positions, with the internal stop washer 274 of the outer end unit 101 in abutment against the stop washer 224″.

It will be seen from the foregoing that each of the outer driving clutch plates 61″—63″ has a spring pressed plunger or stud 142a—142c projecting inwardly therefrom that serves to locate the outer clutch plate in its proper clutch disengaging position when the compressed air is released from the cylinder. Also, as previously described, each of these spring pressed plungers or studs 142a—142c is inseparably or fixedly attached to its respective outer clutch plate, but in such a manner that the stud can have spring pressed movement relatively thereto.

It will be further seen from the foregoing that in the embodiment shown in FIGS. 4 and 5 the self-containment of the outer separating springs 148a—148c on the studs 142a—142c, and the self-containment of the inner locating springs 250a—250c within the spring containing sleeves 248a—248c, together with the capability of said spring containing sleeves 248a—248c to have separate independent sliding movement along the locator rods 185″, results in a construction in which said inner springs 250a—250d act uniformly, so that there is no spring pressure build up, and there are no increasing increments of travel of either the outer springs 148a—148c or the inner springs 250a—250c. It thus provides a construction which can be expanded by the addition of more outer clutch plates and more inner clutch disks.

The manner in which increasing increments of spring compression are avoided in the case of the inner compression springs 250a—250c in the embodiment of FIGS. 4 and 5 will now be described in detail. In the operation of engaging this embodiment, the spring 250c is compressed a total distance equal to the clearance between lined inner clutch disk 103″ and outer clutch plate 64″. This distance is designated S, and is the same for each clutch disk and plate. When the inner clutch disk 103″ moves into contact with the outer clutch plate 64″, the stop washer 274c, which is fixed to spring container sleeve 248c and clutch disk 103″ slides along locator rod 185″ for a distance equal to S. This movement provides a clearance of S which allows the spring spacer sleeve 264b contained in spring container sleeve 248b to slide axially along the locator rod 185″ a distance equal to S before spring 250b is compressed. Thus, spring 250b need only be compressed a total distance equal to the clearance between lined clutch disk 103″ and clutch plate 63″, plus the clearance between lined clutch disk 102″ and clutch plate 63″. This distance is 2S.

When lined clutch disks 103″ and 102″ move over they leave a clearance of 3S between spring sleeve 264a contained in spring container sleeve 248a and washer 274b contained in spring container sleeve 248b. This clearance allows the spring sleeve 264a contained in spring container sleeve 248a to slide axially along the locator rod 185″ a distance equal to 3S before spring 250a is compressed. Spring 250a then is compressed a distance equal to the clearance between lined clutch disk 102″ and clutch plate 62″, plus the clearance between lined clutch disk 101″ and plate 62″. This distance is 2S.

When lined clutch disks 101″, 102″ and 103″ move over, they leave a clearance of 5S between washer 274a contained in spring container sleeve 248a and stop washer 224. If another clutch plate were added, this clearance of 5S would exist between washer 274a contained in spring container sleeve 248a and the spring sleeve of the additional lined disk. This clearance allows the spring sleeve contained in the spring container sleeve of the additional lined disk to slide axially along the locator rod 185″ a distance equal to 5S before its spring is compressed. The spring of the additional lined disk is then compressed a distance equal to the clearance between the lined disk and its two mating plates. This distance is 2S. This same compression of 2S would be true if yet another lined disk and plate would be added.

From the foregoing, it can be seen that a number of additional clutch disks (such as 101″—103″) and clutch plates (such as 62″—63″) could be added to the clutch without any of separating springs 148a″—148c″ or 250a—250c reaching their solid height, since no one spring is compressed more than 2S, viz: there are no increasing increments of spring compression in either the outer springs 148a″—148c″ or the inner springs 250a—250c.

While we have illustrated and described what we regard to be the preferred embodiments of our invention, nevertheless it will be understood that such are merely exemplary, and that numerous modifications and rearrangements may be made therein without departing from the spirit and essence of the invention.

We claim:

1. In a friction clutch, the combination of a clutch housing, an outer series of rotatable clutch elements shiftably mounted therein, an inner series of rotatable clutch elements shiftably mounted therein in interspersed relation with said outer series of clutch elements, power means at the front end of said clutch housing operative to compress said outer and inner series of clutch elements into clutching engagement, and self-contained spring separator mechanism for separating one series of said clutch elements into clutch releasing position when said power means is released, said spring separator mechanism comprising a locator rod, a plurality of stop means along said locator rod for predetermining the normal unclutched positions of said latter clutch elements when the clutch is released, and holding means for said locator rod operating to hold said rod against longitudinal movement both in the operation of engaging said clutch and in the operation of releasing said clutch, and including manually operable means for permitting manually controlled endwise movement of said rod for adjusting the normal clutch releasing positions of said stop means.

2. The combination of claim 1 wherein said spring separator mechanism comprises a shiftable stud carried by each of said shiftable clutch elements in one of said series, a piston head on the front end of said stud, and a bore in said clutch element in which said piston head can reciprocate.

3. The combination of claim 1 wherein said spring separator mechanism comprises a shiftable stud carried by each of said outer series of rotatable shiftable clutch elements, guide means carried by said outer shiftable clutch element in which said stud has reciprocable guided movement, a stop projection on the front portion of said stud in front of said guide means, and wherein said springs include a compression spring on the rear portion of said stud in rear of said guide means.

4. The combination recited in claim 1 including a first set of springs acting on said outer series of clutch elements, a second set of springs acting on said inner series of clutch elements, and means for avoiding increasing increments of compression in the case of said first springs, and also in the case of said second springs.

5. The combination recited in claim 1 in which said springs act on said inner series of clutch elements, and including means for avoiding increasing increments of compression of said springs.

6. The combination recited in claim 1 wherein said spring separator mechanism comprises a locator rod, a plurality of spring container sleeves mounted for separate independent sliding movement on said rod, compression springs on said sleeves, means fixedly attaching each of said sleeves to one of said clutch elements to shift concurrently therewith, spacer sleeves extending between the ends of adjacent container sleeves and having interaction with said springs, and overlapping flanges on the ends of said container sleeves and said spacer sleeves for permitting relative longitudinal movement therebetween in one direction and for positively limiting relative longitudinal movement therebetween in the other direction.

7. The combination recited in claim 6 wherein the front end of each spring abuts a closed front end of its associated spring container sleeve and the rear end of each spring abuts the overlapping front flange of the associated spacer sleeve, and wherein said springs, said container sleeves and said spacer sleeves are freely slidable along said locator rod, whereby increasing increments of spring compression are avoided.

8. The combination recited in claim 6 in which each of said spacer sleeves has a telescoping end having telescopic sliding movement within the adjacent inner end of its associated spring container sleeve, an outwardly projecting flange on the telescoping end of said spacer sleeve, the adjacent end of said compression spring abutting against said outwardly projecting flange of the spacer sleeve, and an inwardly projecting flange on the inner end of said spring container sleeve adapted to have sliding abutment against said outwardly projecting flange for limiting separating movement between said two sleeves.

9. The combination of claim 1 wherein another spring separator mechanism is arranged to have releasing action on the other series of clutch elements.

10. The combination of claim 9 wherein said other spring separator mechanism comprises a stud extending between two successive clutch elements, and retainer means is provided for preventing separation of said stud from one of said latter clutch elements.

11. The combination of claim 9 wherein said other spring separator mechanism comprises a stud extending between a forwardly disposed clutch element and a rearwardly disposed clutch element, and retainer means is provided for positively preventing separation of said stud from said forwardly disposed clutch element in a rearward direction.

12. The combination of claim 1 wherein said separator mechanism comprises a plurality of locator rods, a plurality of spacer sleeves assembled over each of said locator rods, locating shoulders on said spacer sleeves for determining the normal clutch released positions of said latter clutch elements, and spring means acting on said spacer sleeves for normally holding said latter clutch elements pressed against said locating shoulders.

13. The combination of claim 12 wherein adjusting means is provided for adjusting the axial position of said locating rod and said locator shoulders, said adjusting means fixedly securing said locator rod against axial movement in either direction from the adjusted position established by said adjusting means.

14. In a friction clutch, the combination of an outer clutch housing, an outer series of shiftable driving clutch plates within said housing, driving means establishing driving connection between said housing and said driving clutch plates, an inner driven shaft extending coaxially of said housing and said outer clutch plates, an inner series of shiftable driven clutch disks mounted on said driven shaft and interspersed between said driving clutch plates, a compressed air power cylinder and piston mounted on the outer front end of said housing and operative to compress said driving clutch plates and driven clutch disks into clutching engagement, outer separating mechanism for separating said clutch plates when the air pressure is released from said cylinder, said outer separating mechanism comprising a series of outer separator studs reciprocably mounted on each outer clutch plate and projecting inwardly therefrom in a direction away from said power cylinder, an end head on the front portion of each stud permanently fastening said stud to its respective clutch plate, separating compression springs mounted on said studs, and means mounted on the rear portion of each stud for permanently locking a predetermined compression pressure established in said spring before said stud, compression spring and clutch plate are inserted into said clutch housing.

15. In a friction clutch adapted to be engaged by fluid pressure and to be released by spring pressure, the combination of a rotating outer driving clutch annulus, an outer series of friction clutch elements mounted within said annulus for rotation therewith and for shifting movement relatively thereto, an inner driven shaft disposed coaxially of said clutch annulus and rotatable relatively thereto, an inner series of friction clutch elements mounted on said shaft for rotation therewith and interspersed between said outer friction clutch elements, fluid pressure operated power means at the outer ends of both series of clutch elements, means operated by said fluid operated power means for causing shifting movement of one series of said clutch elements in one direction to effect clutching engagement between said outer and inner series of clutch elements, spring restoring mechanism comprising a locating rod, spring means associated therewith for restoring said latter series of clutch elements to normal position when released by said power means, a threaded bushing rigidly secured to one end of said locating rod, a locator disk fixedly secured to said inner driven shaft, and an internally threaded hole in said locator disk through which said threaded bushing screws for positively shifting said locating rod in either an inward or outward direction.

16. In a friction clutch, the combination of an outer series of shiftable clutch elements, an inner series of shiftable clutch elements interspersed between said outer clutch elements, power means operative to compress said outer and inner series of clutch elements together in clutching engagement, spring separator mechanism for separating said series of clutch elements when said power means is released, said separator mechanism comprising a locator rod, a plurality of spring container sleeves slidably mounted on said rod, each of said container sleeves having one end closed and the other end open around said rod, a compression spring contained completely within each of said container sleeves, spacer sleeves slidably mounted on said rod between said container sleeves, one end of each spacer sleeve having abutment against the adjacent closed end of the next adjacent container sleeve, a telescoping head on the other end of each spacer sleeve having telescopic sliding movement within the opposite open end of the next adjacent container sleeve and being in abutment with the adjacent end of the spring contained therein, and means connecting each of said container sleeves with one of said shiftable clutch elements.

17. In a friction clutch, the combination of a driving series of rotatable shiftable clutch elements, a driven series of rotatable shiftable clutch elements mounted in interspersed relation with said driving series, power means operative to compress said driving and driven series of clutch elements into clutching engagement, and spring separator mechanism for separating one series of said clutch elements into clutch releasing position when said power means is released, said separator mechanism comprising a locator rod, a succession of stops along said rod for determining the clutch released positions of said latter clutch elements when said power means is released, a succession of springs along said rod for moving said clutch elements against said stops, and means so constructed and arranged that during the compression of said springs in the engagement of said clutch there are no increasing increments of compression set up in the successive springs.

18. The combination of claim 17 wherein the latter recited means enables additional clutch elements to be added without causing said compression springs to go solid.